(12) United States Patent
Zhu et al.

(10) Patent No.: US 12,068,651 B2
(45) Date of Patent: Aug. 20, 2024

(54) WINDING STRUCTURE FOR ELECTRIC MOTOR AND ELECTRIC MOTOR

(71) Applicant: SAIC MOTOR CORPORATION LIMITED, Shanghai (CN)

(72) Inventors: Jun Zhu, Shanghai (CN); Jian Wang, Shanghai (CN); ShaoRui Huang, Shanghai (CN); JieBao Li, Shanghai (CN); Wei He, Shanghai (CN); YaRu Qu, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 339 days.

(21) Appl. No.: 17/435,060

(22) PCT Filed: Dec. 10, 2019

(86) PCT No.: PCT/CN2019/124249
§ 371 (c)(1),
(2) Date: Aug. 31, 2021

(87) PCT Pub. No.: WO2020/192181
PCT Pub. Date: Oct. 1, 2020

(65) Prior Publication Data
US 2022/0140683 A1 May 5, 2022

(30) Foreign Application Priority Data
Mar. 22, 2019 (CN) .......................... 201910223084.8

(51) Int. Cl.
*H02K 3/28* (2006.01)
*H02K 3/50* (2006.01)

(52) U.S. Cl.
CPC .................. *H02K 3/28* (2013.01); *H02K 3/50* (2013.01); *H02K 2203/09* (2013.01)

(58) Field of Classification Search
CPC ........ H02K 3/28; H02K 3/50; H02K 2203/09; H02K 3/12; H02K 3/04; H02K 3/14; Y02T 10/64
(Continued)

(56) References Cited

U.S. PATENT DOCUMENTS 6,348,750 B1 * 2/2002 Taji .......................... H02K 9/06
310/179
2003/0214196 A1 11/2003 Cai et al.
(Continued)

FOREIGN PATENT DOCUMENTS

| CN | 1431755 A | 7/2003 |
|---|---|---|
| CN | 1489259 A | 4/2004 |

(Continued)

OTHER PUBLICATIONS

International Search Report for PCT/CN2019/124249, mailed Mar. 12, 2020.
(Continued)

*Primary Examiner* — Ahmed Elnakib
(74) *Attorney, Agent, or Firm* — NIXON PEABODY LLP

(57) ABSTRACT

Disclosed are a winding structure for an electric motor and an electric motor. The electric motor comprises an iron core (1) and a multi-phase winding structure (2), wherein the iron core (1) is provided with a plurality of grooves (11) arranged in the circumferential direction, and one side of the iron core (1) is an inserting side, and the other side is a welding side; the multi-phase winding structure (2) is arranged in the plurality of grooves (11) of the iron core (1), each phase of the winding structure (2) comprises N parallel winding sub-windings formed by a plurality of hairpin conductors of different shapes, and N is a positive even number; and the conductors, forming each phase of the winding structure (2),
(Continued)

of the same sub-winding are located on a non-adjacent conductor layer corresponding to the grooves (11).

14 Claims, 13 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2007/0018525 A1* | 1/2007 | Cai | B60L 50/16 |
| | | | 310/201 |
| 2014/0285054 A1* | 9/2014 | Han | B60L 50/51 |
| | | | 310/201 |
| 2016/0164359 A1* | 6/2016 | Han | H02K 3/28 |
| | | | 310/208 |

FOREIGN PATENT DOCUMENTS

| | | |
|---|---|---|
| CN | 101436796 A | 5/2009 |
| CN | 103270673 A | 8/2013 |
| CN | 206041669 U | 3/2017 |
| CN | 107112838 A | 8/2017 |
| CN | 107112874 A | 8/2017 |
| CN | 108432097 A | 8/2018 |
| EP | 1120884 A2 | 8/2001 |
| EP | 3029810 A2 | 6/2016 |
| JP | 2005110361 A | 4/2005 |
| JP | 2005328661 A | 11/2005 |
| JP | 2009124902 A | 6/2009 |
| JP | 2010119294 A | 5/2010 |
| JP | 2015076905 A | 4/2015 |
| JP | 2017158255 A | 9/2017 |
| WO | 2017149934 A1 | 9/2017 |

OTHER PUBLICATIONS

JP Office Action for Application No. 2021-550257, mailed Oct. 4, 2022 (with machine translation) 8 pp.
Extended European Search Report for EP Application No. 19920891.9, mailed Oct. 11, 2022 (10 pp.).

* cited by examiner

WINDING STRUCTURE FOR ELECTRIC MOTOR AND ELECTRIC MOTOR

CROSS-REFERENCE TO RELATED APPLICATIONS

This application is the United States National Phase of International Application No.: PCT/CN2019/124249, filed Dec. 10, 2019, which in turn claims priority benefit of Chinese Application No.: CN201910223084.8, filed Mar. 22, 2019, the entire contents of which are herein incorporated by reference in their entirety.

TECHNICAL FIELD

The present invention relates to the technical field of electric motors, and specifically to a winding structure for an electric motor and such an electric motor.

BACKGROUND

An electric motor includes a stator assembly and a rotor assembly rotating with respect to the stator assembly. The stator assembly generally includes windings inserted into slots of the stator assembly respectively. At present, hairpin-type stator windings are used in drive motors of new energy vehicles to improve thermal and overall performance of electric motors.

In the prior art, multi-layer (4 layers and above) flat copper wire wave windings are mostly wound in parallel with one phase and multiple phase branches (2 branches and above). Take an example of a stator of 4-layer conductor in one slot, wherein a first parallel-wound branch U1 of U-phase winding is formed by connecting the first and second layers of conductors in slots assigned to U-phase, and a second parallel-wound branch U2 of U-phase winding is formed by connecting the third and fourth layers of conductors in slots assigned to U-phase; the first parallel winding branch U1 and the second parallel winding branch U2 are connected head-to-head for phasing out of U-phase, and the first parallel winding branch U1 and the second parallel winding branch U2 are also connected tail-to-tail to form a neutral point of U-phase with the V and W phases, thus forming a three-phase winding. For a flat copper wire winding motor, multi-layer flat copper wire wave winding can reduce loss caused by skin effect in rotating motor. However, due to the above winding connecting style, electromagnetic coupling between parallel winding branches of the same phase tends to be uneven, causing unbalanced current flows in the parallel winding branches, which increases copper loss of electric motor and thus affects the performance of the electric motor.

Therefore, it is expected to optimize the design of winding structure of stator of the existing electric motor to effectively avoid defects of uneven electromagnetic coupling between the parallel-wound branches of the same phase.

SUMMARY OF THE INVENTION

In order to solve the above technical problems, the present invention provides a winding structure for an electric motor and an electric motor comprising the winding structure. The winding structure makes it possible to balance the counter-electromotive forces induced by the parallel-wound sub-windings of each phase of winding structure of stator under load operation, thus preventing current loops generated for avoiding counter-electromotive potential between parallel-wound sub-windings of the same phase, and thus eliminating additional electrical losses.

The present invention provides a winding structure arranged on an iron core of a stator, the iron core comprising a plurality of slots, an inserting side and a welding side, wherein the winding structure comprises a plurality of hairpin-type conductor of different shapes located in the slots, N parallel-wound sub-windings formed by the plurality of hairpin-type conductor and electrode wiring conductors, where N is a positive even number; wherein the conductors of the same sub-winding of the winding structure of each phase are located in non-adjacent layers of the slot, each sub-winding including: a first standard hairpin-type conductor having an in-slot section of the $j^{th}$ layer in one slot and an in-slot section of the $j-1^{th}$ layer of another slot spaced apart from the one slot by y slots in a first circumferential direction; a second standard hairpin-type conductor having an in-slot section of the $j^{th}$ layer in one slot and an in-slot section of the $j+1^{th}$ layer of another slot spaced apart from the one slot by y slots in the first circumferential direction; a hairpin-type conductor for serial connection having an in-slot section of the $L^{th}$ layer in one slot and an in-slot section of a first layer in another slot spaced apart from the one slot by y−1 slots in the first direction of the circumference; wherein a plurality of first standard hairpin-type conductor in the same winding cycle are configured such that: the in-slot sections in each slot are all in the same layer; the second standard hairpin-type conductor connects two first standard hairpin-type conductors of neighboring winding cycles to form a secondary sub-winding; and the hairpin-type conductor for serial connection connects the first standard hairpin-type conductors of neighboring secondary sub-windings to form a sub-winding; where y denotes winding pitch; L is the total number of the layers in a slot; j denotes a natural number meeting the condition $1 \leqslant j \leqslant L$; and the first circumferential direction is a clockwise direction or a counterclockwise direction.

Preferably, the conductors for phase out of each sub-winding of the winding structure of each phase are configured in the first layer or the $L^{th}$ layer of the respective slots, and are configured to: for half sub-windings, the conductors for phase out are located in the first layer of the $i^{th}$ slot, and the conductors forming the neutral line are located in the $L^{th}$ layer of a slot spaced apart from the $i^{th}$ slot by y+1 slots in a second circumferential direction; and for the other half sub-windings, the conductor for phase out are located in the $L^{th}$ layer of the $i-1^{th}$ slots, and the conductor forming the neutral line are located in the first layer of slots spaced apart from the $i-1^{th}$ slots by y+1 slots in the first circumferential direction; where i denotes an integer meeting the condition $1 \leq i \leq Q$, and Q denotes the total number of the slots; the first layer denotes the outermost layer, and the Lth layer denotes the innermost layer; and the second circumferential direction is opposite to the first circumferential direction.

The present invention further provides a winding structure arranged on an iron core of a stator, the iron core comprising a plurality of slots, an inserting side and a welding side, wherein the winding structure comprises a plurality of hairpin-type conductor of different shapes located in the slots, N parallel-wound sub-windings formed by the plurality of hairpin-type conductor and electrode wiring conductors, where N is a positive even number; wherein the conductors of the same sub-winding of the winding structure of each phase are located in non-adjacent layers of the slot, each sub-winding including: a first standard hairpin-type conductor having an in-slot section of the $j^{th}$ layer in one slot and an in-slot section of the $j-1^{th}$ layer of another slot spaced apart from the one slot by y slots in a first circumferential direction; a second standard hairpin-type conductor having an in-slot section of the $j^{th}$ layer in one slot and an in-slot section of the $j+1^{th}$ layer of another slot spaced apart from the one slot by y slots in the first circumferential direction; a hairpin-type conductor for serial connection having an in-slot section of the $L^{th}$ layer in one slot and an in-slot section of a first layer in another slot spaced apart from the one slot by y+1 slots in the first direction of the circumference; wherein a plurality of first standard hairpin-type conductor in the same winding cycle are configured such that: the in-slot sections in each slot are all in the same layer; the second standard hairpin-type conductor connects two first standard hairpin-type conductors of neighboring winding cycles to form a secondary sub-winding; and the hairpin-type conductor for serial connection connects the first standard hairpin-type conductors of neighboring secondary sub-windings to form a sub-winding; where y denotes winding pitch; L is the total number of the layers in a slot; j denotes a natural number meeting the condition $1 \leq j \leq L$; and the first circumferential direction is a clockwise direction or a counterclockwise direction.

Preferably, the conductors for phase out of each sub-winding of the winding structure of each phase are configured in the first layer or the $L^{th}$ layer of the respective slots, and are configured to: for half sub-windings, the conductors for phase out are located in the first layer of the $i^{th}$ slot, and the conductors forming the neutral line are located in the $L^{th}$ layer of a slot spaced apart from the $i^{th}$ slot by y−1 slots in a second circumferential direction; and for the other half sub-windings, the conductor for phase out are located in the $L^{th}$ layer of the i−$1^{th}$ slots, and the conductor forming the neutral line are located in the first layer of slots spaced apart from the i−$1^{th}$ slots by y−1 slots in the first circumferential direction; where i denotes an integer meeting the condition 1—i—Q, and Q denotes the total number of the slots; the first layer denotes the outermost layer, and the $L^{th}$ layer denotes the innermost layer; and the second circumferential direction is opposite to the first circumferential direction.

The present further provides an electric motor comprising: an iron core having a plurality of slots arranged along a circumferential direction, one side of the iron core being an inserting side, and the opposite side being a welding side; a winding structure as above, which is arranged in the plurality of slots of the iron core.

Preferably, a neutral line of each phase of the winding structure in the first layer is configured such that two neutral conductors located at circumferentially side positions form a hairpin-type conductor and a U-shaped conductor connection section of the neutral hairpin-type conductor on the inserting side has a de-insulated portion, and a neutral conductor located at a circumferentially middle position is electrically connected to said de-insulated portion; and a neutral line of each phase of the winding structure in the $L^{th}$ layer is configured such that two neutral conductors located at circumferentially side positions form a hairpin-type conductor and the U-shaped conductor connection section of the neutral hairpin-type conductor on the inserting side has a de-insulated portion, and a neutral conductor located in a circumferentially middle position is electrically connected to said de-insulated portion.

Preferably, each of the plurality of hairpin-type conductor includes a U-shaped conductor connection section provided on the inserting side of the core, and the conductor connection sections of the plurality of hairpin-type conductor at overlapping positions are provided in a sequential lamination from the inside to the outside.

Preferably, pin ends of the hairpin-type conductor are configured such that pin ends of the electrode wiring of each phase of the winding structure are located on the inserting side of the core, and other pin ends extend out from the welding side of the core for providing electric connection.

Preferably, the electric motor further comprising: a busbar provided on the inserting side of the iron core; wherein the hairpin-type conductors for serial connection have no conductor connection sections, and conductor sections in slots of each hairpin-type conductor for serial connection and electrode wiring conductors are configured such that pin ends protruding from the inserting side are electrically connected by the busbar.

Preferably, the pin ends of the winding structure of each phase protruding from the soldering side of the core are configured such that the pin ends are bent with a distance of the same number of slots from the conductor body to a middle position of the corresponding slot along the circumference to be soldered to form the connection.

Preferably, pin ends for welding connection are lined up in sequence and in the same direction as the depth of the slots.

In contrast to the prior art, the present invention presents a new solution for optimizing winding structure. The winding structure includes parallel-wound sub-windings formed by hairpin-type conductors. Conductors forming the same sub-winding of each phase of winding structure are located in non-adjacent layers of respective slots; that is to say, conductors forming different sub-windings are spaced apart in the slots. The invention disclosed makes it possible to balance the counter-electromotive forces induced by parallel-wound sub-windings of each phase of winding structure of stator under load operation, thus preventing current loops generated for avoiding counter-electromotive potential between parallel-wound sub-windings of the same phase, and thus eliminating additional electrical losses.

In a preferred embodiment of the present invention, each hairpin-type conductor includes a U-shaped conductor connection section provided on the inserting side of the core, and the conductor connection sections of hairpin-type conductors at overlapping positions are provided in a sequential lamination from inside to outside. This way makes it possible to improve heat dissipation capacity of conductors in the layer near slot openings by connecting conductors at the slot opening to conductors at the bottom of the slot, and to balance temperature difference between different layers in the same slot to increase power of the electric motor for running continuously, and to improve electric motor power density which further contributes to reducing heat radiated from stator to rotor and rotor temperature.

In another preferred embodiment of the present invention, a busbar is provided on the inserting side of iron core; and accordingly, hairpin-type conductors for serial connection have no conductor connection sections and the conductor sections in slots of each hairpin-type conductor for serial connection and electrode wiring conductors are configured such that pin ends protruding from the inserting side are provided with electrically connection by busbar. This way makes it possible that the height of electric motor winding ends can be minimized by reducing the number of conductor connection sections in the parallel winding of the same phase, which is in line with the design trend of miniaturization of electric motors and reduces the difficulty of manufacturing hairpin-type conductor formation.

In a further preferred embodiment of the present invention, the neutral wires located in the innermost and outermost layers of the winding structure are further optimized, wherein the neutral line of each phase of the winding structure in the first layer and the $L^{th}$ layer are configured such that the two neutral conductors located at circumferentially side positions are formed by hairpin-type conductors and a U-shaped conductor connection section of neutral hairpin-type conductor on the inserting side has a de-insulated portion, and the neutral hairpin-type conductor at the circumferentially middle position is electrically connected to said de-insulated portions. This way simplifies the end structure of the stator and facilitates quick assembly on production line.

BRIEF DESCRIPTION OF THE DRAWINGS

FIG. 4a shows an expanded view of wiring of winding structure on the inserting side of the winding structure in FIG. 3a.

FIG. 14a shows an expanded view of wiring of winding structure on the inserting side of core of winding structure in FIG. 13a.

Figure 1:
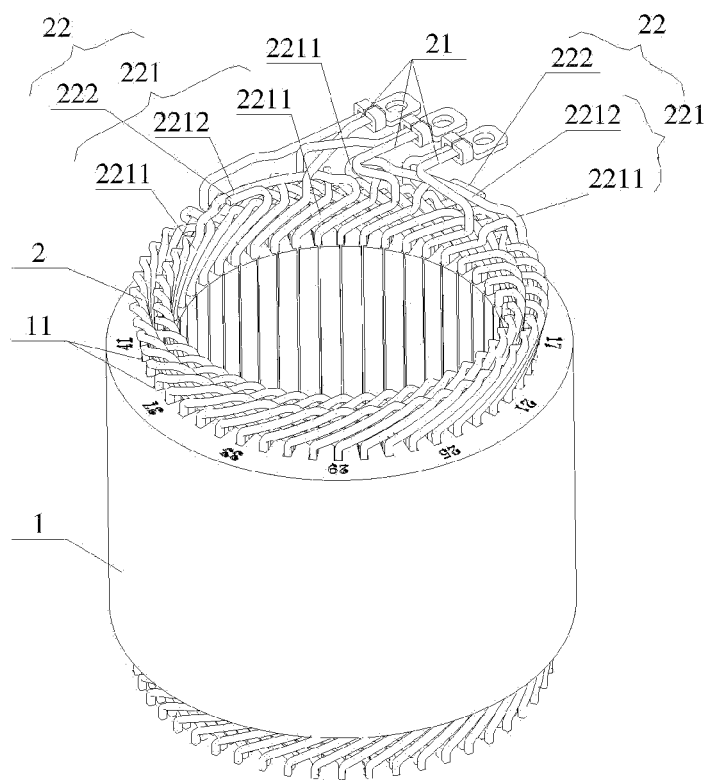
FIG. 1 shows a schematically the inserting side of a motor core configured with a winding structure of Embodiment I.

In the figures:
Core—1, slot—11, winding structure—2, phase out line—21, neutral line—22, hairpin-type conductor for neutral wiring—221, conductor for neutral wiring—2211, de-insulated portion—2212, conductor for neutral wiring—222, U-shaped connection section—23, protrusion—24, busbar—3, rabbet—31, conductor for connection—32.

DETAILED DESCRIPTION

In order to enable a person skilled in the art to better understand the technical solution of the invention, the following is a further detailed description of the invention in conjunction with the accompanying drawings and specific embodiments.

Without loss of generality, the embodiments take as examples three-phase stator flat-wire windings shown in the figures, which has a core with 48 slots arranged in a circumferential direction (Q=48), four layers of conductors arranged (L=4), two parallel windings per phase, eight poles (p=8), and six pitches (y=Q/p=6), detailing the electronic winding structure described herein. It should be understood that the specific structure of the core characterized by the above specific parameters does not constitute a substantial limitation for the electric motor and its winding structure scheme for which protection is requested in this application.

Explanation of Terms

Slots: 48 slots are defined in order to enumerate the slots arranged in a circumferential on the core, which can be named as slot 1, slot 2 . . . , and slot 48 in the clockwise or counter-clockwise direction.

Layers: take a conductor with 4-layer slots as example, the layers in the slot can be named sequentially as layer 1 (the first layer), layer 2 (the second layer), layer 3 (the third layer) and layer 4 (the fourth layer) from inside to outside.

Inside and outside: the orientation terms "inside" and "outside" are defined with respect to the core, with the side near the axis of the core being "inside" and the side near the outer peripheral surface of the core being "outside".

Standard hairpin-type conductor: a conductor having two conductor sections in two slots located y (winding pitch) apart.

Hairpin-type conductor with two in-slot conductor sections spaced apart by y−1 slots are short-pitch conductors; hairpin-type conductor with two in-slot conductor sections spaced apart by y+1 slots are long-pitch conductors.

Embodiment I

Figure 2:
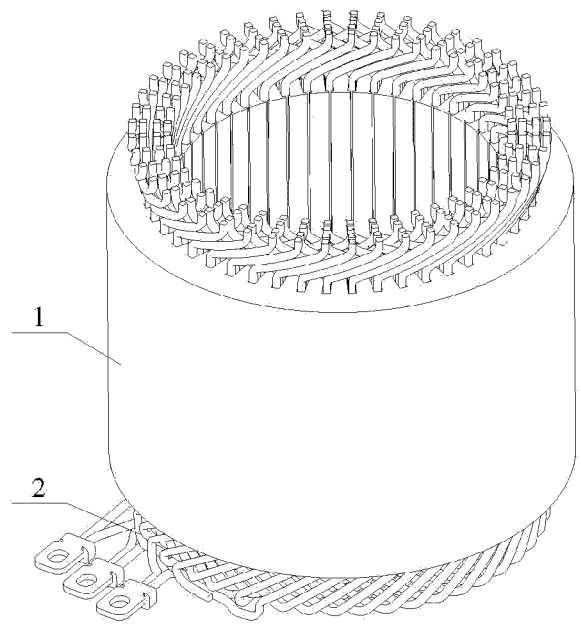
FIG. 2 shows a schematically the welding side of a motor core configured with a winding structure of Embodiment I.

See FIGS. 1 and 2. FIG. 1 shows schematically an inserting side of an electric motor core configured with the winding structure described in this embodiment, and FIG. 2 shows schematically a welding side of an electric motor core configured with the winding structure described in this embodiment.

As shown in these figures, the electric motor has a plurality of slots 11 arranged in a circumferential direction on the core 1. One side of the core 1 is the inserting side and the other side of the core 1 is the welding side. The three-phase winding structure 2 is set in the plurality of slots 11 of the core 1 to form electrical phases different from each other: U-phase, V-phase, and W-phase. It should be understood that the design of the present invention is applicable to other multi-phase winding structures.

Each phase of the winding structure 2 includes N (a positive even number) parallel-wound sub-windings formed by a plurality of hairpin-type conductors of different shapes and electrode wiring conductors, and the hairpin-type conductor forming the winding structure of each phase are received in the respective slots of the stator core. The conductors forming the same sub-winding of each phase of the winding structure are located in non-adjacent layers of respective slots 11; that is to say, conductors forming different sub-windings are spaced apart between slots. The invention disclosed makes it possible to balance the counter-electromotive forces induced by the parallel-wound sub-windings of each phase of the winding structure of the stator coil under load operation, thus preventing current loops generated for avoiding counter-electromotive potential between the parallel-wound sub-windings of the same phase, and thus eliminating the additional electrical losses. Two parallel sub-windings of U-phase of a stator coil connected in a star style are taken as examples to illustrate the invention disclosed. It should be understood the invention is also applicable to a stator coil formed in angular style, which will not be described here for concision.

Figure 3A:
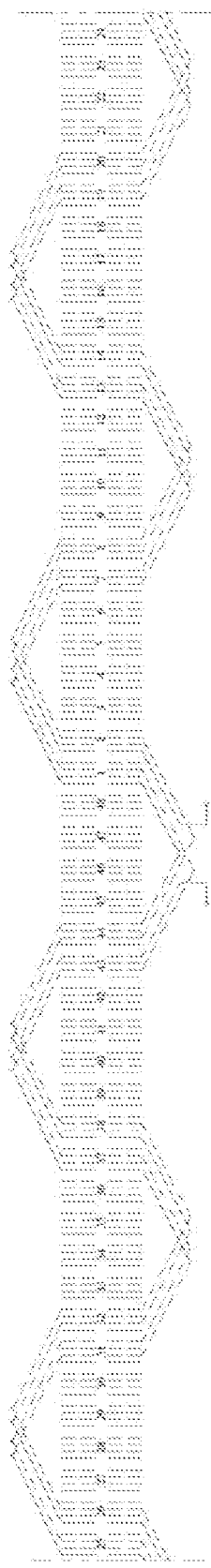
FIG. 3a shows wiring of U1 sub-winding of winding structure.
Figure 3B:
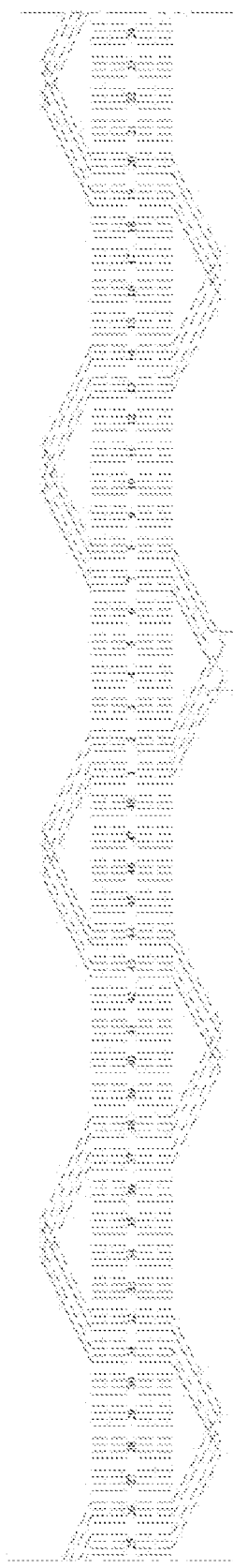
FIG. 3b shows wiring of U2 sub-winding of winding structure.
Figure 4A:
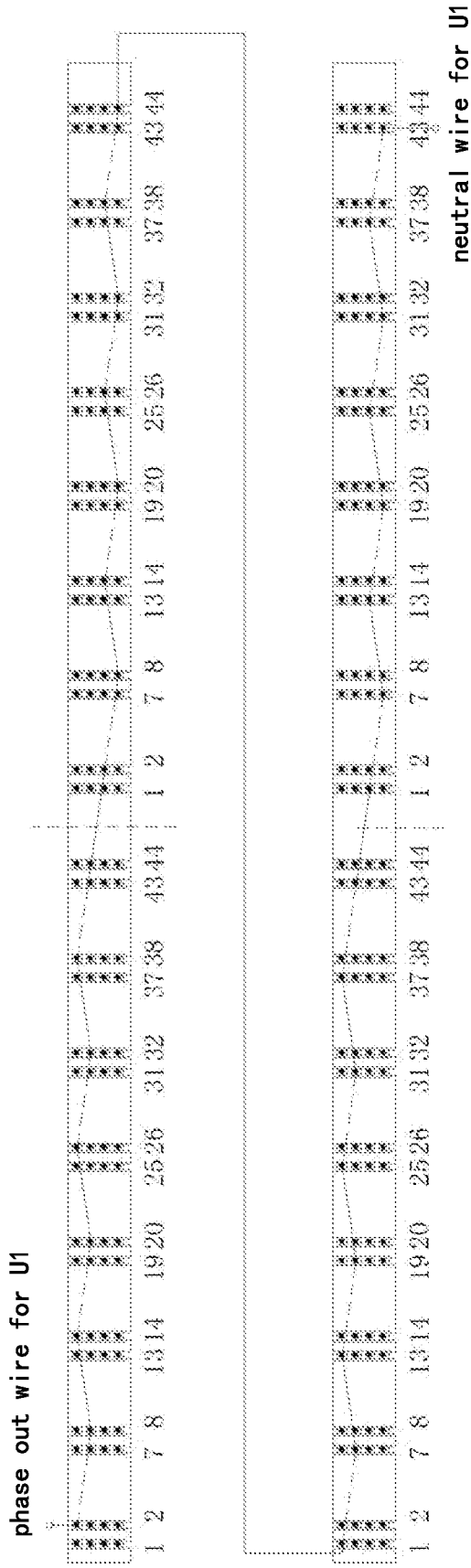
Figure 4B:
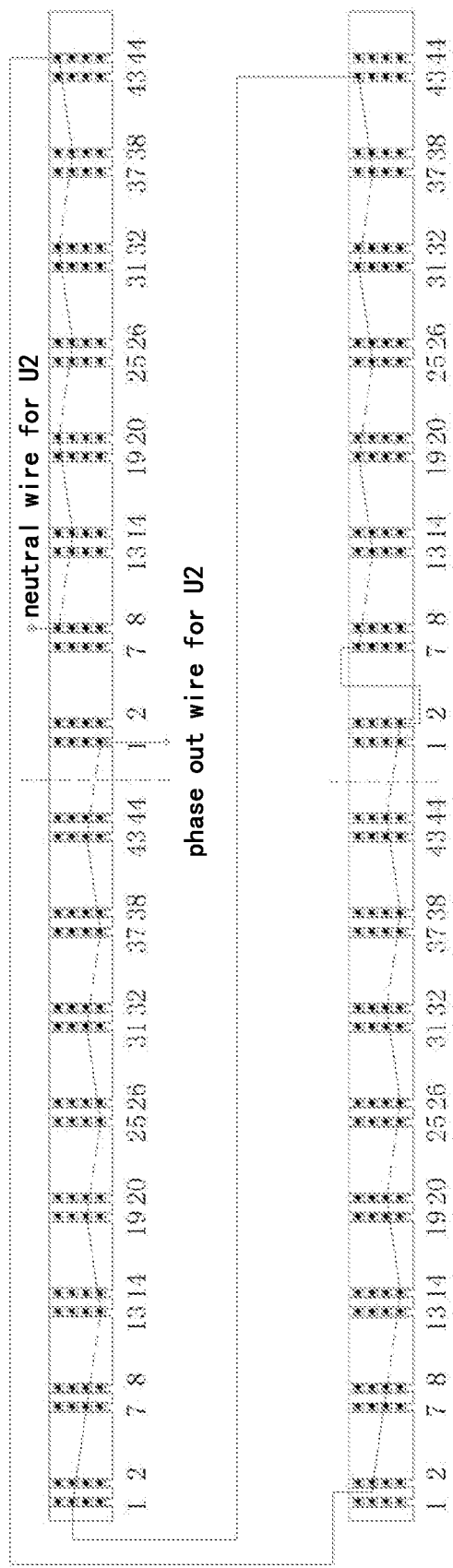
FIG. 4b shows an expanded view of wiring of winding structure on the inserting side of the winding structure in FIG. 3b.
Figure 5A:
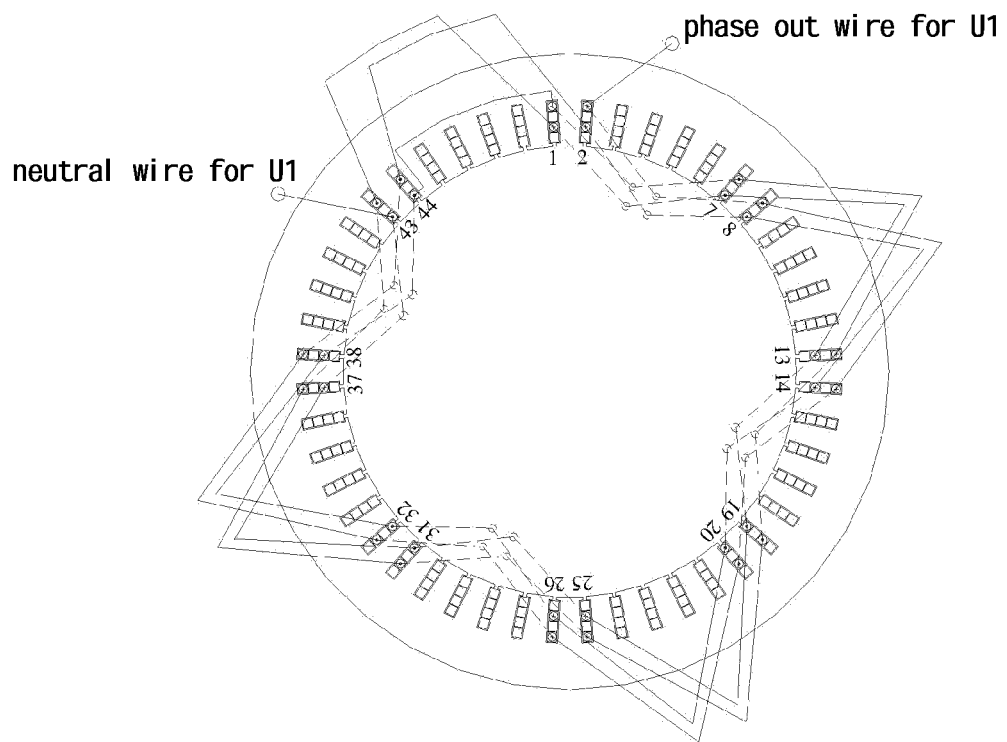
FIG. 5a shows schematically a first sub-winding U1 of U-phase winding.
Figure 5B:
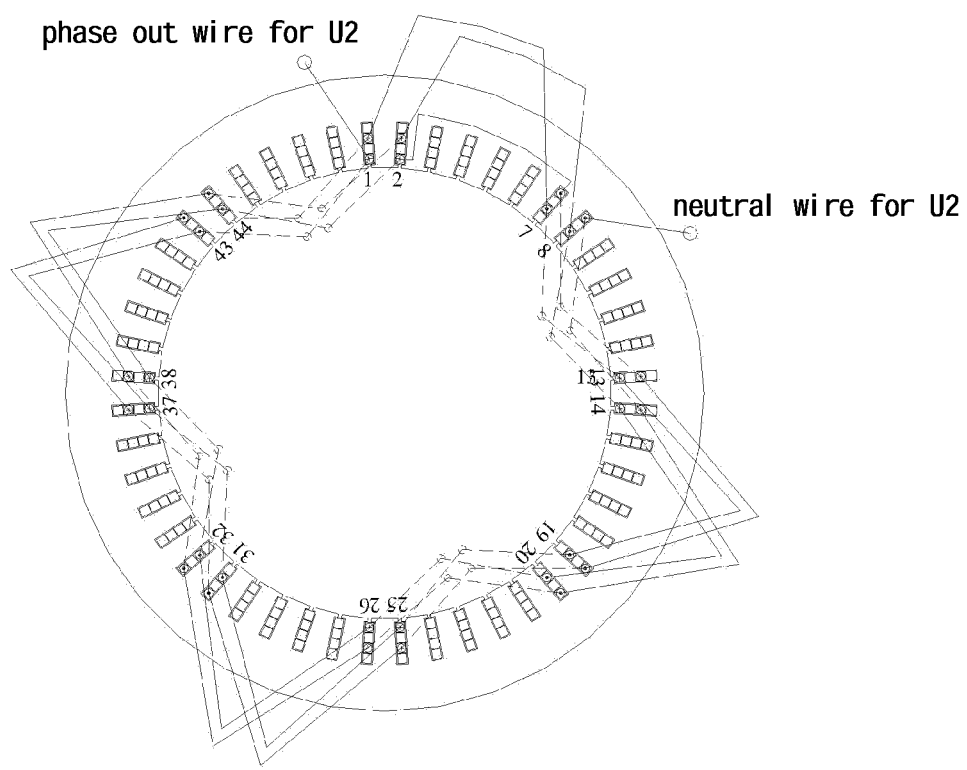
FIG. 5b shows schematically a second sub-winding U2 of U-phase winding.

Besides the above-mentioned Figures, please also refer to FIG. 3*a*, FIG. 3*b*, FIG. 4*a*, FIG. 4*b*, FIG. 5*a* and FIG. 5*b*. FIG. 3*a* shows wiring of U1 sub-winding of the winding structure. FIG. 3*b* shows wiring of U2 sub-winding of the winding structure. FIG. 4*a* shows an expanded view of wiring of the winding structure on the inserting side of the winding structure in FIG. 3*a*. FIG. 4*b* shows an expanded view of wiring of the winding structure on the inserting side of the winding structure in FIG. 3*b*. FIG. 5*a* shows schematically a first sub-winding branch U1 arrangement of a U-phase winding. FIG. 5*b* shows schematically a second sub-winding branch U2 arrangement of U-phase winding.

In-slot conductor connections of U1 sub-winding of U-phase winding are listed as follows (in the direction of phase out line to neutral line):

2.1-8.2^14.1-20.2^26.1-32.2^38.1-44.2^2.3-8.4^14.3-20.4^26.3-32.4^38.3-44.4^1.1-7.2^13.1-19.2^25.1-31.2^37.1-43.2^1.3-7.4^13.3-19.4^25.3-31.4^37.3-43.4;

where "Q.L" denotes in-slot conductor section of the $L^{th}$ layer in the $Q^{th}$ slot. For example, "2.1" denotes the first layer in the second slot. "^" denotes a U-shaped conductor connection section. For example, 8.2^14.3 denotes a hairpin-type conductor having an in-slot conductor section of the second layer in the eighth slot and an in-slot conductor section of the third layer in the fourteenth slot connected by a U-shaped connection section 24. "-" denotes soldering connection.

In-slot conductor connections of U2 sub-winding of U-phase winding are listed as follows (in the direction of phase out line to neutral line):

1.4-43.3^37.4-31.3^25.4-19.3^13.4-7.3^1.2-43.1^37.2-31.1^25.2-19.1^13.2-7.1^2.4-44.3^38.4-32.3^26.4-20.3^14.4-8.3^2.2-44.1^38.2-32.1^26.2-20.1^14.2-8.1;

where "^" denotes a U-shaped conductor connection section, and "-" denotes soldering connection.

Herein, except for the conductors providing electrode wiring (21, 22), each hairpin-type conductor includes a U-shaped conductor connection section 24 on the inserting side of the core, and the conductor connection sections of the plurality of hairpin-type conductor at the overlapping positions are provided in a sequential lamination from inside to outside. Specifically, in this embodiment with four layers of in-slot conductors, the U-shaped conductor connection section that partially connects the first and fourth (L) layers of in-slot conductors is located at the outermost layer of the sequential lamination.

As shown in the above figures, except for the electrode wiring conductors, three types of hairpin-type conductors are adopted to the winding structure. The pin ends of different types of the hairpin-type conductor are configured such that the pin ends of the electrode wiring of each phase of the winding structure are located on the inserting side of the core, and the other pin ends are extended from the welding side of the core for providing an electric connection. This arrangement enables a compact wire structure.

U1 and U2, two sub-windings of U-phase winding shown, are both arranged with four winding cycles, and each sub-winding includes two standard hairpin-type conductors and one hairpin-type conductor for serial connection.

Specifically, a first standard hairpin-type conductor has an in-slot conductor section of the $j^{th}$ layer in a slot and an in-slot conductor section of the $j-1^{th}$ layer in a slot that is spaced apart from that slot with y slots distance in a first circumferential direction. That is to say, the two in-slot conductors are y slots apart and one layer apart to each other.

Figure 6A:
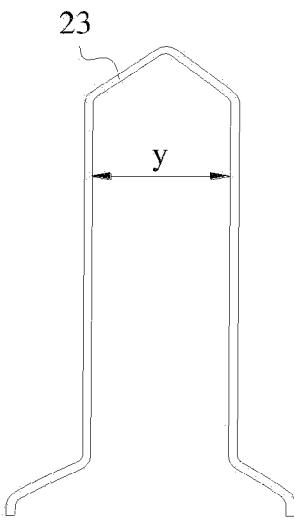
FIG. 6a-FIG. 6b show various types of hairpin-type conductors of the winding structures of embodiments of the present application.

As shown in FIG. 6*a*, it illustrates schematically the structure of a first standard hairpin-type conductor (y=6). Specifically, y denotes winding pitch; L denotes sequence number of layers of a conductor in slot; and j denotes a natural number meeting the condition $1 \leq j \leq L$. Here, "first circumferential direction" means clockwise direction or counterclockwise direction.

As shown in FIG. 3*a* and FIG. 4*a*, twelve first standard hairpin-type conductors are used for U1 sub-winding: 8.2^14.1, 20.2^26.1, 32.2^38.1, 8.4^14.3, 20.4^26.3, 32.4^38.3, 7.2^13.1, 19.2^25.1, 31.2^37.1, 7.4^13.3, 19.4^25.3, 31.4^37.3.

As shown in FIG. 3*b* and FIG. 4*b*, twelve first standard hairpin-type conductors are used for U2 sub-winding: 43.3^37.4, 31.3^25.4, 19.3^13.4, 43.1^37.2, 31.1^25.2, 19.1^13.2, 44.3^38.4, 32.3^26.4, 20.3^14.4, 44.1^38.2, 32.1^26.2, 20.1^14.2.

In this embodiment, first standard hairpin-type conductors in one winding cycle are configured such that relevant in-slot conductor sections are all located in the same layer.

For example, for four winding cycles of U1 sub-winding, first standard hairpin-type conductors (8.2^14.1, 20.2^26.1, 32.2^38.1) of first winding cycle (shown on upper left of FIG. 4*a*) are located in the second layer and the first layer in sequence; first standard hairpin-type conductors (8.4^14.3, 20.4^26.3, 32.4^38.3) of second winding cycle (shown on upper right of FIG. 4*a*) are located in the fourth layer and the third layer in sequence; first standard hairpin-type conductors (7.2^13.1, 19.2^25.1, 31.2^37.1) of third winding cycle (shown on lower left of FIG. 4*a*) are located in the second layer and the first layer in sequence, and first standard hairpin-type conductors (7.4^13.3, 19.4^25.3, 31.4^37.3) of fourth winding cycle (shown on lower right of FIG. 4*a*) are located in the fourth layer and the third layer in sequence.

Similarly, for four winding cycles of U2 sub-windings, first standard hairpin-type conductors (43.3^37.4, 31.3^25.4, 19.3^13.4) of first winding cycle (shown on upper left of FIG. 4*b*) are located in the third layer and the fourth layer in sequence; first standard hairpin-type conductors (43.1^37.2, 31.1^25.2, 19.1^13.2) of second winding cycle (shown on lower right of FIG. 4*b*) are located in the first layer and the second layer in sequence; first standard hairpin-type conductors (44.3^38.4, 32.3^26.4, 20.3^14.4) of third winding cycle (shown on lower left of FIG. 4*b*) are located in the third layer and the fourth layer in sequence; first standard hairpin-type conductors (44.1^38.2, 32.1^26.2, 20.1^14.2) of fourth winding cycle (shown on upper right of FIG. 4*b*) are located in the first layer and the second layer in sequence.

A second standard hairpin-type conductor has an in-slot conductor section of the $j^{th}$ layer in a slot and an in-slot conductor section of the $j+1^{th}$ layer in a slot spaced apart by y slots in first circumferential direction. That is to say, the two in-slot conductors are y slots apart and one layer apart to each other but in the opposite direction to the first standard hairpin-type conductor, with substantially the same shapes as those of the first standard hairpin-type conductors shown in FIG. 6a.

As shown in FIG. 3a and FIG. 4a, two second standard hairpin-type conductors are used in U1 sub-winding: 44.2^2.3, 43.2^1.3 for connecting two first standard hairpin-type conductors of neighboring winding cycles to form a secondary sub-winding. Specifically, the second standard hairpin-type conductor 44.2^2.3 connects the first standard hairpin-type conductor 32.2^38.1 of the first winding cycle to the first standard hairpin-type conductor 8.4^14.3 of the second winding cycle to form a secondary sub-winding of U1 sub-winding; the second standard hairpin-type conductor 43.2^1.3 connects the first standard hairpin-type conductor 31.2^37.1 of the third winding cycle with the first standard hairpin-type conductor 7.4^13.3 of the fourth winding cycle to form another secondary sub-winding of U1 sub-winding.

As shown FIG. 3b and FIG. 4b, two second standard hairpin-type conductors are used in U2 sub-winding: 7.3^1.2, 8.3^2.2 for connecting two first standard hairpin-type conductors of neighboring winding cycles to form a secondary sub-winding. Specifically, the second standard hairpin-type conductor 7.3^1.2 connects the first standard hairpin-type conductor 19.3^13.4 of the first winding cycle to the first standard hairpin-type conductor 43.1^37.2 of the second winding cycle to form a secondary sub-winding of U2 sub-winding; the second standard hairpin-type conductor 8.3^2.2 connects the first standard hairpin-type conductor 20.3^14.4 of the third winding cycle to the first standard hairpin-type conductor 44.1^38.2 of the fourth winding cycle to form another secondary sub-winding of U2 sub-winding.

Figure 6B:
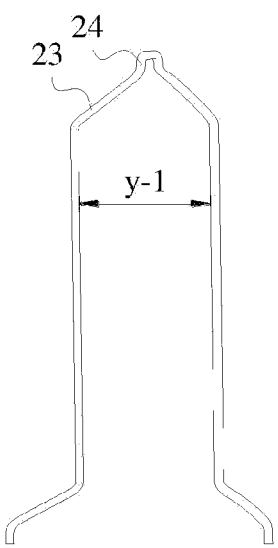

In this embodiment, a hairpin-type conductor for serial connection has an in-slot conductor section in the $L^{th}$ ($4^{th}$ in this embodiment) layer in one slot and an in-slot conductor section in the $1^{st}$ layer in another slot spaced apart from the one slot by y−1 (in this embodiment five) slots in the first circumferential direction. This hairpin-type conductor for serial connection can be also referred as a short pitch conductor. As shown in FIG. 6b, it illustrates a first hairpin-type conductor for serial connection with a pitch of 5 (y−1) slots.

As shown in FIG. 3a and FIG. 4a, one hairpin-type conductor for serial connection is used in U1 sub-winding: 44.4^1.1, in serial connection with two standard hairpin-type conductors. First standard hairpin-type conductors 32.4^38.3 and 7.2^13.1 of neighboring secondary sub-windings are connected by this hairpin-type conductor for serial connection to form U1 sub-winding.

As shown in FIG. 3b and FIG. 4b, one hairpin-type conductor for serial connection is used in U2 sub-winding: 7.1^2.4, in serial connection with two standard hairpin-type conductors. First standard hairpin-type conductors 19.1^13.2 and 44.3^38.4 of neighboring secondary sub-windings are connected by this hairpin-type conductor for serial connection to form U2 sub-winding.

In this invention, an electrode wiring is not of a typical type of hairpin-type conductor, i.e., not a U-shape in strict sense. Preferably, in this invention, a conductor forming phase out wire 21 (see FIG. 1) of each sub-winding of each phase winding structure is configured in the $1^{st}$ or the $L^{th}$ layer to facilitate the management of the external wire connection.

For half (the number of N/2) sub-windings, conductors forming phase out wires 21 are located in the $1^{st}$ layer of the $S(i)^{th}$ slot, and conductors forming neutral wires 22 are located in the $L^{th}$ layer spaced apart by y+1 slots in the second circumferential direction, where i denotes an integer meeting the condition $1 \leq i \leq Q$, and Q denotes the total number of the slots; the $1^{st}$ layer denotes the outermost layer and the $L^{th}$ layer denotes the innermost layer; the second circumferential direction is opposite to the first circumferential direction.

As shown in FIG. 3a and FIG. 4a, slot conductor with in-slot connection number 2.1 is for phasing out of U1 sub-winding, and slot conductor with in-slot connection number 43.4 is for neutral wiring of U1 sub-winding.

For the other half sub-windings, a conductor forming phase out wire is located in the $L^{th}$ layer of the S(i−1) slot, and a conductor forming neutral wire is located in the $1^{st}$ layer spaced apart by y+1 slots along the first circumferential direction.

As shown in FIG. 3b and FIG. 4b, in-slot conductor located with in-slot connection number 1.4 is for phasing out of U2 sub-winding, and in-slot conductor located with in-slot connection number 8.1 is for neutral wiring of U2 sub-winding.

Figure 7:
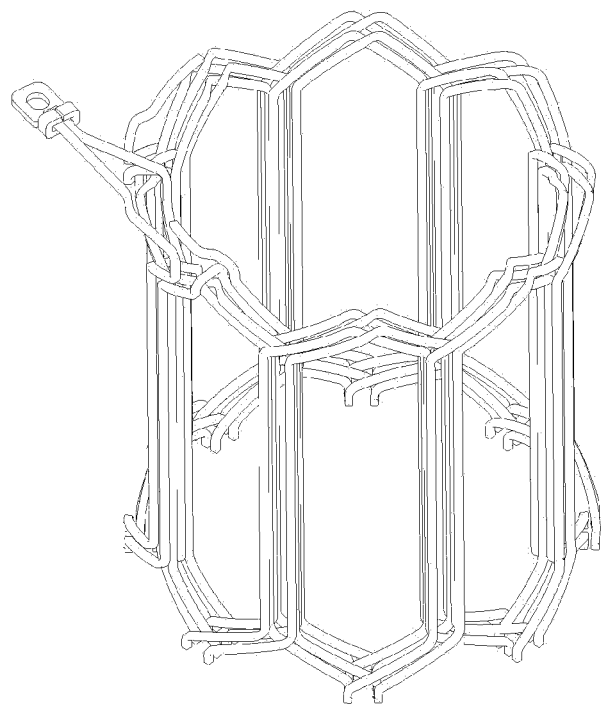
FIG. 7 shows a perspective view of sub-windings wound in parallel to form a U-phase of winding structure of embodiments of the present application.
Figure 8:
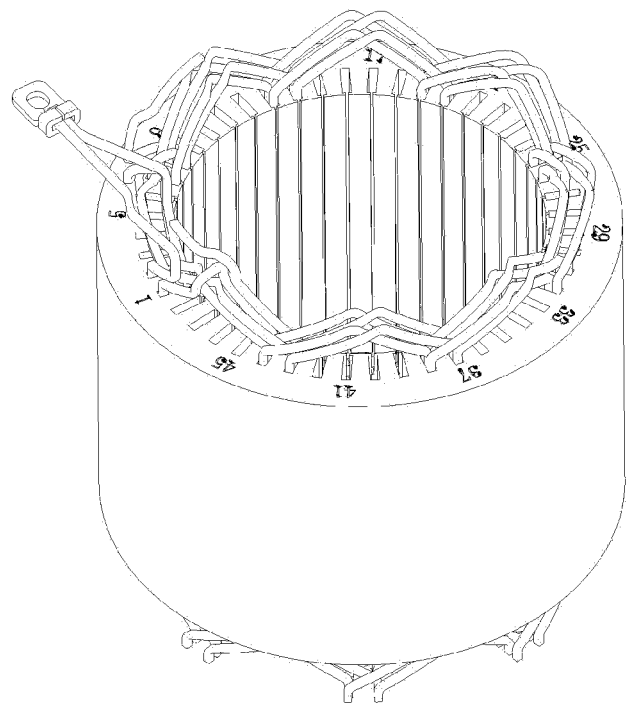
FIG. 8 shows assembling relationship of U-phase of winding structure shown in FIG. 7 and a stator core.

Here, a hairpin-type conductor for serial connection, as U-shaped conductor connection section connection conductor sections in slots of the first and fourth layers, is located in the outermost layer of a lamination. As shown in FIG. 6b, there exists a protrusion 23 in the middle of the U-shaped conductor connection section for a better fit of the other conductor sections on the inserting side. Please refer to FIG. 7 and FIG. 8. FIG. 7 shows a perspective view of U-phase winding synthesized by the aforementioned sub-windings, and FIG. 8 shows U-phase winding shown in FIG. 7 in relation to the stator core assembly.

In order to obtain a better soldering side process, pin ends of winding structure of each phase protruding from the soldering side of the core are configured such that the pin ends are bent with a distance of the same number of slots from conductor body to a middle position of the corresponding slot along the circumferential direction to be soldered to provide connection. The "middle position" in this disclosure includes a central position along the circumferential direction and a position non-central but between the corresponding slots. It should be understood that as long as the bending trends of the pin ends on the welding side of each phase winding are the same and the pin ends are radially aligned, a regular welding position can be formed on the welding side with good workmanship. Specifically, as shown in FIG. 2, pin ends for welding connection are lined up in sequence and in the same direction as the depth of the slots.

In particular, V-phase and W-phase winding structures are arranged in a similar way as U-phase winding structure described in the previous exemplary illustration, and thus details thereof will not be described here for clarity.

Further, preferably, neutral wires located in the innermost and the outermost layers of a winding structure can be further optimized. Specifically, neutral wires of each phase located in the innermost and the outermost layers are configured such that the two neutral wire conductors located in circumferentially side positions are formed by a hairpin-type conductor and U-shaped conductor connection section of the hairpin-type conductor located on the inserting side has a de-insulated portion and is electrically connected to the neutral wire conductors located in the circumferentially middled position by this de-insulated portion. This simplifies the end structure and facilitates quick assembly of the production line.

As shown in FIG. 1, neutral conductors of each phase located in the first layer are configured such that neutral conductors of V-phase and W-phase 2211 located in the circumferentially side positions are neutral hairpin-type conductors 221, and U-shaped conductor connection sections of neutral hairpin-type conductors 221 located on the inserting side have de-insulated portions 2212, and neutral conductor of phase U 222 located in the circumferentially middle position is electrically connected to the de-insulated portions 2212 to form a neutral connection point for a sub-winding of each phase. Neutral conductor of each phase located in the $4^{th}$ layer (the number equal to L) is configured such that neutral conductors of V phase and W phase 2211 located in the circumferentially side positions are neutral hairpin-type conductor 221, and U-shaped conductor connection sections of the neutral hairpin-type conductors 221 located on the inserting side have de-insulated portions 2212, and neutral conductor of U-phase 222 located in the circumferentially middle position is electrically connected to the de-insulated portions 2212 to form a neutral connection point for the other sub-winding of each phase.

It should be noted that neutral hairpin-type conductors 221 shown in FIG. 1 are only exemplary illustrations. Neutral wire of each sub-winding can be realized as a separate slot conductor, as long as it falls in the scope of protection of the invention of this application.

Embodiment II

Figure 9:
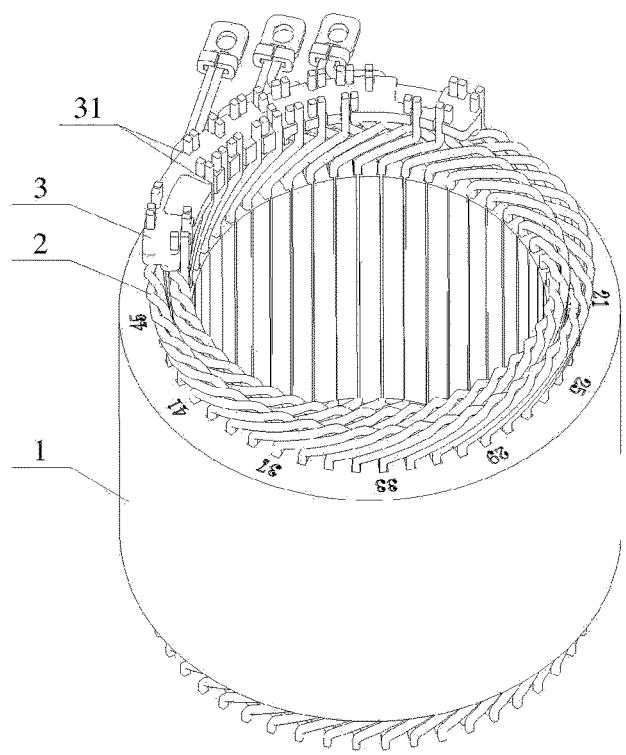
FIG. 9 shows schematically the inserting side of a motor core configured with winding structure of Embodiment II.
Figure 10:
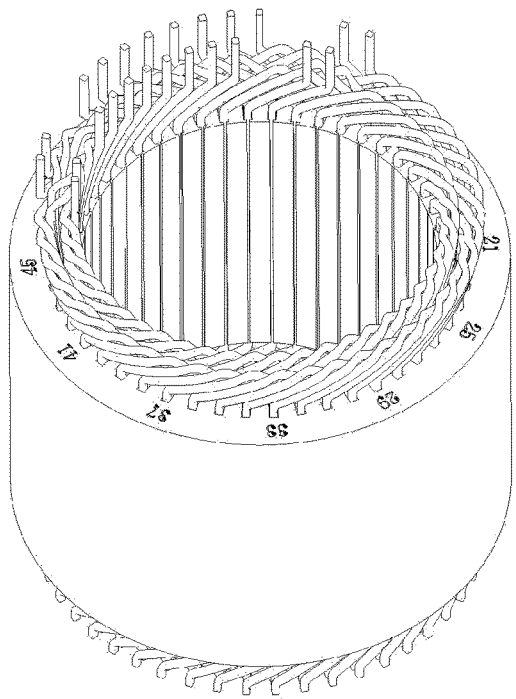
FIG. 10 shows schematically motor core shown in FIG. 9 without a busbar.
Figure 11:
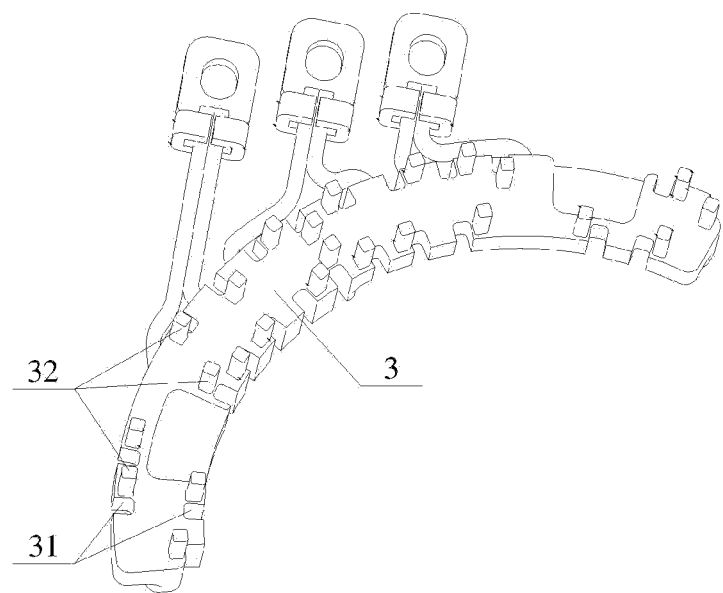
FIG. 11 shows schematically the busbar shown in FIG. 9.
Figure 12:
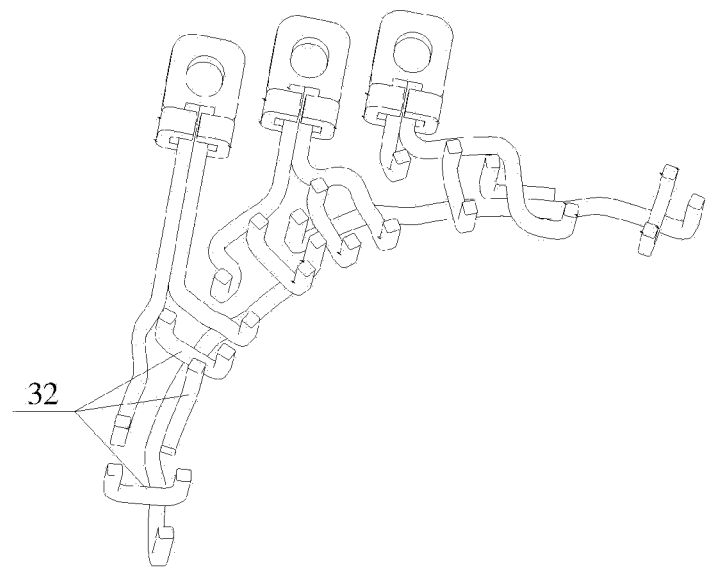
FIG. 12 shows schematically conductors of the inner side of the busbar shown in FIG. 11.

The inventive concept of Embodiment II is similar to that of Embodiment I. The difference thereof lies in the style of hairpin-type conductors in the outermost layers on the inserting side. Please see FIG. 9, FIG. 10, FIG. 11 and FIG. 12. FIG. 9 shows schematically the inserting side of a motor core configured with winding structure as described in Embodiment II. FIG. 10 shows schematically the motor core shown in FIG. 9 without a busbar. FIG. 11 shows schematically the busbar of the winding structure shown in FIG. 9. FIG. 12 shows schematically the inner side of the busbar shown in FIG. 11.

In this embodiment, a busbar 3 is provided on the inserting side of a core to provide electrical connection of conductors in the slots.

As shown in the above figures, hairpin-type conductors for serial connections have no conductor connection sections. Conductor sections in two slots of each hairpin-type conductor for serial connections are configured such that pin ends protruding from the inserting side are electrically connected by busbar 3. This way allows the overall formation to be effectively controlled. Specifically, as shown in FIG. 11 and FIG. 12, a busbar 3 is provided with rabbets 31, and connection conductors 32 on the inner side of the busbar 3 with winding connection relationship to achieve functional connections with winding conductor ends inserted in corresponding slots. In addition, busbar is also used to electrically connect pin ends of electrode wiring of each phase of winding structure protruding from the inserting side of the core. This embodiment includes pin ends for phasing out and pin ends for neutral wiring.

It should be understood that shapes of connection conductors 32 are different according to electrode wirings on the inserting side and locations of pin ends of hairpin-type conductors for serial connection.

In-slot conductor connections of U1 sub-winding of U-phase of winding structure are listed as follows (in the direction of phase out line to neutral line) 2.1-8.2^14.1-20.2^26.1-32.2^38.1-44.2^2.3-8.4^14.3-20.4^26.3-32.4^38.3-44.4↔1.1-7.2^13.1-19.2^25.1-31.2-37.1-43.2^1.3-7.4^13.3-19.4^25.3-31.4^37.3-43.3; where "^" denotes a U-shaped conductor connection section, "-" denotes soldering connection, and "↔" denotes busbar connection. The in-slot conductor connection number of busbar connection for U1 sub-winding connection is 44.4^1.1.

In-slot conductor connections of U2 sub-winding of U-phase of winding structure are listed as follows (in the direction of phase out line to neutral line):
1.4-43.3^37.4-31.3^25.4-19.3^13.4-7.3^1.2-43.1^37.2-31.1^25.2-19.1^13.2-7.1↔2.4-44.3^38.4-32.3^26.4-20.3^14.4-8.3^2.2-44.1^38.2-32.1^26.2-20.1^1 4.2-8.1; where "^" denotes U-shaped conductor connection section, "-" denotes soldering connection, and "↔" denotes busbar connection. The in-slot conductor connection number of busbar connection for U1 sub-winding connection is 7.1^2.4.

It can be understood that this solution is similar with the first embodiment regarding the arrangement of winding structure, and thus will not be repeated here.

Embodiment III

Figure 13A:
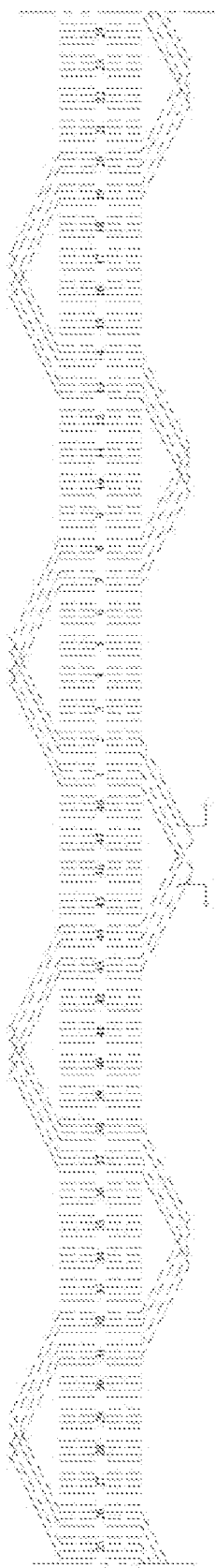
FIG. 13a shows U1 sub-winding wiring of winding structure of Embodiment III.
Figure 13B:
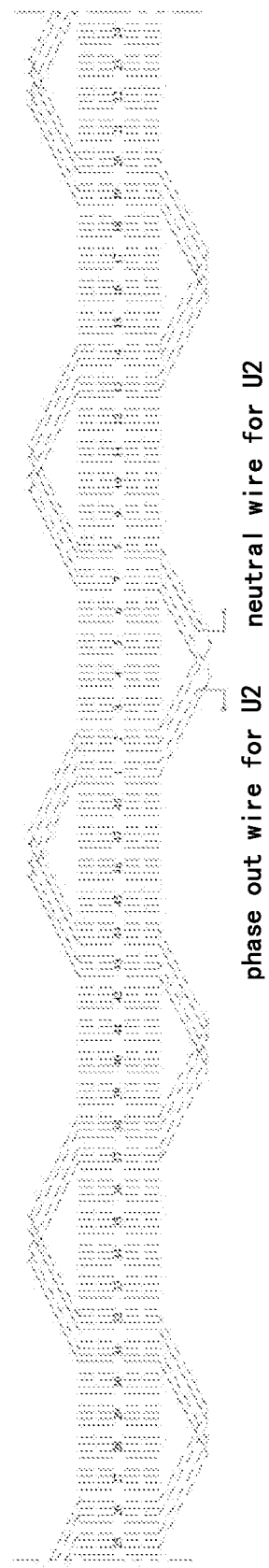
FIG. 13b shows U2 sub-winding wiring of winding structure of Embodiment III.
Figure 14A:
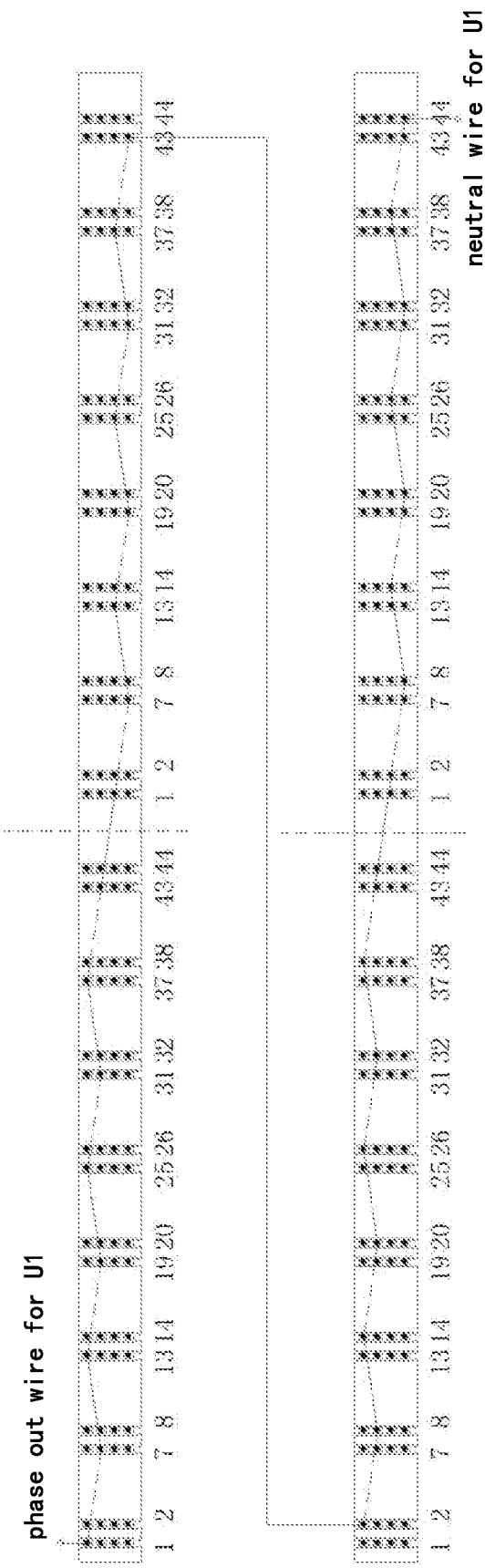
Figure 14B:
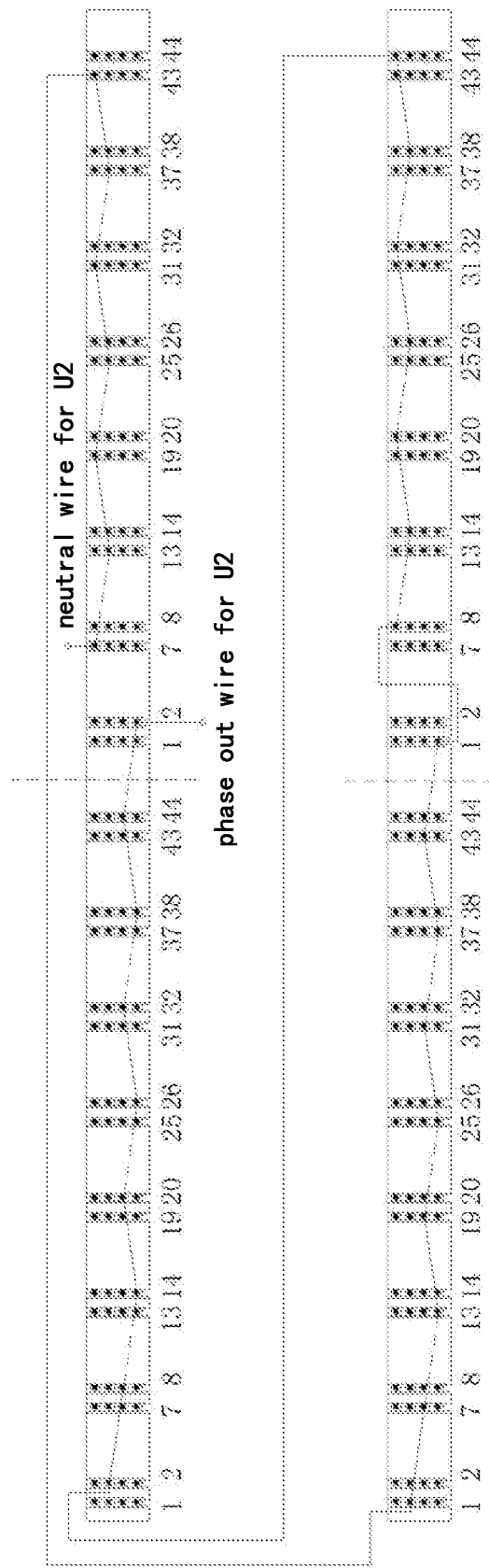
FIG. 14b shows an expanded view of wiring of winding structure on the inserting side of core of winding structure in FIG. 13b.

Embodiment III has a similar inventive concept of motor and its winding structure to those described in embodiments I and II. The difference lies in the realization of hairpin-type conductor for serial connection used to connect neighboring secondary sub-windings. Please refer to FIGS. 13a, 13b, 14a and 14b. FIG. 13a shows wiring of U1 sub-winding of winding structure of Embodiment III. FIG. 13b shows wiring of U2 sub-winding of winding structure of Embodiment III. FIG. 14a shows an expanded view of wiring of winding structure on the inserting side of core of the winding structure in FIG. 13a. FIG. 14b shows an expanded view of wiring of winding structure on the inserting side of core of winding structure in FIG. 13b.

As in embodiments I and II, Embodiment III adopts three hairpin-type conductors, with each sub-winding comprising two standard hairpin-type conductors and one hairpin-type conductor for serial connection.

In-slot conductor connections of U1 sub-winding of U-phase winding are listed as follows (in the direction of phase out line to neutral line):
1.1-7.2^14.1-19.2^25.1-31.2^37.1-43.2^1.3-7.4^13.3-19.4^25.3-31.4^37.3-43.4^2.1-8.2^14.1-20.2^26.1-32.2^38.1-44.2^2.3-8.4^14.3-20.4^26.3-32.4^38.3-44.4; where "^" denotes a U-shaped conductor connection section; and "-" denotes soldering connection.

In-slot conductor connections of U2 sub-winding of U-phase winding are listed as follows (in the direction of phase out line to neutral line):
2.4-44.3^38.4-32.3^26.4-20.3^14.4-8.3^2.2-44.1^38.2-32.1^26.2-20.1^14.2-8.1^1.4-43.3^37.4-31.3^25.4-19.3^13.4-7.3^1.2-43.1^37.2-1.1^25.2-19.1^13.2-7.1; where "^" denotes a U-shaped conductor connection section; and "-" denotes welding connection.

Specifically, a first standard hairpin-type conductor has an in-slot conductor section of the $j^{th}$ layer in one slot and an in-slot conductor section of the $j-1^{th}$ layer in another slot spaced apart from the one slot by y slots in a first circumferential direction. That is to say, the two in-slot conductors are y slots apart and one layer apart to each other. A plurality of first standard hairpin-type conductors in a winding cycle are configured such that the corresponding in-slot conductor sections are all located in the same layer.

As shown in FIG. 13a and FIG. 14a, twelve first standard hairpin-type conductors are used for U1 sub-winding with slotted conductor connections numbers of: 7.2^14.1, 19.2^25.1, 31.2^37.1, 7.4^13.3, 19.4^25.3, 31.4^37.3, 8.2^14.1, 20.2^26.1, 32.2^ 38.1, 8.4^14.3, 20.4^26.3, 32.4^38.3.

As shown in FIG. 13b and FIG. 14b, twelve first standard hairpin-type conductors are used for U2 sub-winding with slotted conductor connections numbers of: 44.3^38.4, 32.3^26.4, 20.3^14.4, 44.1^38.2, 32.1^26.2, 20.1^14.2, 43.3^37.4, 31.3^25.4, 19.3^ 13.4, 43.1^37.2, 31.1^25.2, 19.1^13.2-7.1.

Specifically, a second standard hairpin-type conductor has an in-slot conductor section of the j$^{th}$ layer in one slot and an in-slot conductor section of the j+1$^{th}$ layer in another slot spaced apart from the one slot by y slots in a first circumferential direction. That is to say, the two in-slot conductors are y slots apart and one layer apart to each other but in the opposite direction to that of the first standard hairpin-type conductor.

As shown in FIG. 13a and FIG. 14a, two second standard hairpin-type conductors are used for U1 sub-winding with slotted conductor connection numbers of: 43.2^1.3, 44.2^2.3 for connecting two first standard hairpin-type conductors of neighboring winding cycles respectively to form a secondary sub-winding.

As shown in FIG. 13b and FIG. 14b, two second standard hairpin-type conductors are used for U2 sub-winding with slotted conductor connection numbers of: 8.3^2.2, 7.3^1.2 for connecting two first standard hairpin-type conductors of neighboring winding cycles respectively to form a secondary sub-winding.

Figure 15:
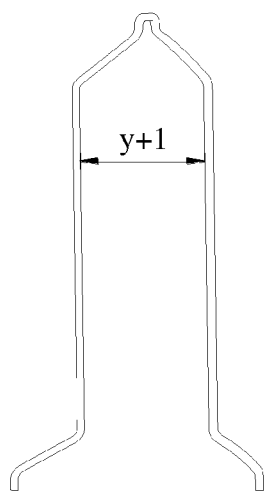
FIG. 15 shows schematically a hairpin-type conductor for serial connection of Embodiment III.

In this embodiment, a hairpin-type conductor for serial connection has an in-slot conductor section in the L$^{th}$ (4$^{th}$ in this embodiment) layer of one slot and an in-slot conductor section in the 1st layer in another slot spaced apart from the one slot by y+1 (in this embodiment seven) slots in a first circumferential direction. This hairpin-type conductor for serial connection can also be referred as a long pitch conductor. As shown in FIG. 15, it illustrates a second hairpin-type conductor for serial connection with a pitch of 7 (y+1) slots.

As shown in FIG. 13a and FIG. 14a, hairpin-type conductor for serial connection of U1 sub-winding has an in-slot conductor connection number: 43.4^2.1 in serial connection with a standard hairpin-type conductor.

As shown in FIG. 13b and FIG. 14b, hairpin-type conductor for serial connection of U2 sub-winding has an in-slot conductor connection number: 8.1^1.4, in serial connection with a standard hairpin-type conductor.

Preferably, in this invention, conductors forming phase out wire 21 of each sub-winding of each phase winding structure are configured in the 1$^{st}$ or the L$^{th}$ layer to facilitate the management of external wire connection.

For half (with the number of N/2) sub-windings, in-slot conductors forming phase out wires are located in the 1$^{st}$ layer of the S(i)$^{th}$ slot, and in-slot conductors forming neutral wires are located in the L$^{th}$ layer spaced apart by y−1 slots along a second circumferential direction; where i denotes an integer meeting the condition 1≤i≤Q, and Q denotes the total number of slots; the 1$^{st}$ layer denotes the outermost layer and the L$^{th}$ layer denotes the innermost layer; the second circumferential direction is opposite to the first circumferential direction.

As shown in FIG. 13a and FIG. 14a, slot conductor for phasing out of U1 sub-winding has in-slot conductor connection number 1.1, and in-slot conductor for neutral wiring of U1 sub-winding has in-slot conductor connection number 44.4.

For the other half sub-windings, in-slot conductors for phasing out are located in the L$^{th}$ layer of the S(i−1) slot, and in-slot conductors for neutral wiring are located in the 1$^{st}$ layer spaced apart by y−1 slots along a first circumferential direction.

As shown in FIG. 13b and FIG. 14b, in-slot conductor for phasing out of U2 sub-winding has in-slot conductor connection number 2.4, and in-slot conductor for neutral wiring of U2 sub-winding has the in-slot conductor connection number 7.1.

Other connection relationships of winding structure of this embodiment, comprising but not limited to those of hairpin-type conductors for serial connection, are the same as in the previous embodiments, and thus will not be repeated here.

Embodiment IV

Embodiment IV has a similar inventive concept to that of Embodiment III. The difference lies in the realization of hairpin-type conductor of the outermost layer on the inserting side, i.e., the functional connection between the hairpin-type conductor for serial connection and the electrode wiring conductor is realized on the inserting side using a busbar (not shown in the figures).

In-slot conductor connections of U1 sub-winding of U-phase winding are listed as follows (in the direction of phase out line to neutral line):
1.1-7.2^14.1-19.2^25.1-31.2^37.1-43.2^1.3-7.4^13.3-19.4^25.3-31.4^37.3-43.4↔2.1-8.2^14.1-20.2^26.1-32.2^38.1-44.2^2.3-8.4^14.3-20.4^26.3-32.4^38.3-44.4;
where "^" denotes a U-shaped conductor connection section; "-" denotes soldering connection; "↔" denotes a busbar connection.

In-slot conductor connections of U2 sub-winding of U-phase winding are listed as follows (in the direction of phase out line to neutral line):
2.4-44.3^38.4-32.3^26.4-20.3^14.4-8.3^2.2-44.1^38.2-32.1^26.2-20.1^14.2-8.1↔1.4-43.3^37.4-31.3^25.4-19.3^13.4-7.3^1.2-43.1^37.2-31.1^25.2-19.1^13.2-7.1; where "^" denotes a U-shaped conductor connection section; "-" denotes soldering connection; "↔" denotes a busbar connection.

It should be noted that this invention with the above embodiments is not limited to be applied to a three-phase star-connected electric motor shown in the figures, and also not limited to specific parameters disclosed herein. It should be understood that winding structure and the application thereof with the same inventive concept are within the scope of protection of this invention.

The above is only preferred embodiments of the present invention. It should be appreciated that for a person of ordinary skill in the art, improvements and modifications can be made without departing from the principles of the present invention, and these improvements and modifications are within the scope of protection of the present invention.

The invention claimed is:

1. A winding structure arranged on an iron core of a stator, the iron core having a plurality of slots arranged along a circumferential direction, one side of the iron core being an inserting side, and the opposite side being a welding side, wherein the winding structure comprises a plurality of hairpin-type conductors of different shapes located in the slots, N parallel-wound sub-windings formed by the plurality of hairpin-type conductor and electrode wiring conductors, where N is a positive even number;

wherein the conductors of each one of the N-parallel wound sub-windings of the winding structure of each phase are located in non-adjacent layers of the slot, each sub-winding including:
a first standard hairpin-type conductor having an in-slot section of a $j^{th}$ layer in one slot and an in-slot section of a $j-1^{th}$ layer of another slot spaced apart from the one slot by y slots in a first circumferential direction;
a second standard hairpin-type conductor having an in-slot section of the $j^{th}$ layer in one slot and an in-slot section of a $j+1^{th}$ layer of another slot spaced apart from the one slot by y slots in the first circumferential direction;
a hairpin-type conductor for serial connection having an in-slot section of an $L^{th}$-layer in one slot and an in-slot section of a first layer in another slot spaced apart from the one slot by y−1 slots in the first circumferential direction;
wherein a plurality of first standard hairpin-type conductor in a same winding cycle, which corresponds to a circumvolution in the first circumferential direction are configured such that: the in-slot sections in each slot are all in the same layer; the second standard hairpin-type conductor connects two first standard hairpin-type conductors of two neighboring winding cycles to form a secondary sub-winding; and the hairpin-type conductor for serial connection connects the first standard hairpin-type conductors of two neighboring secondary sub-windings in the first circumferential direction to form a sub-winding;
where y denotes winding pitch; L is the total number of the layers in a slot; j denotes a natural number meeting the condition $1 \le j \le L$; and the first circumferential direction is a clockwise direction or a counterclockwise direction.

2. The winding structure according to claim 1, wherein the conductors for phase out of each sub-winding of the winding structure of each phase are configured in the first layer or the $L^{th}$ layer of the respective slots, and are configured to: for half sub-windings, the conductors for phase out are located in the first layer of an $i^{th}$ slot, and the conductors forming a neutral line are located in the $L^{th}$ layer of a slot spaced apart from the $i^{th}$ slot by y+1 slots in a second circumferential direction; and for the other half sub-windings, the conductor for phase out are located in the $L^{th}$ layer of an $i-1^{th}$ slots, and the conductor forming the neutral line are located in the first layer of slots spaced apart from the $i-1^{th}$ slots by y+1 slots in the first circumferential direction; where i denotes an integer meeting the condition $1 \le i \le Q$, and Q denotes the total number of the slots; the first layer denotes the outermost layer, and the $L^{th}$ layer denotes the innermost layer; and the second circumferential direction is opposite to the first circumferential direction.

3. An electric motor comprising:
the winding structure according to claim 1; and
the iron core of the stator, the winding structure being arranged in the plurality of slots of the iron core.

4. The electric motor according to claim 3, wherein a neutral line of each phase of the winding structure in the first layer is configured such that two neutral conductors located at circumferentially side positions form a neutral hairpin-type conductor and a U-shaped conductor connection section of the neutral hairpin-type conductor on the inserting side has a de-insulated portion, and a neutral conductor located at a circumferentially middle position is electrically connected to said de-insulated portion; and a neutral line of each phase of the winding structure in the $L^{th}$ layer is configured such that two neutral conductors located at circumferentially side positions form a hairpin-type conductor and the U-shaped conductor connection section of the neutral hairpin-type conductor on the inserting side has a de-insulated portion, and a neutral conductor located in a circumferentially middle position is electrically connected to said de-insulated portion.

5. The electric motor according to claim 3, wherein each of the plurality of hairpin-type conductor includes a U-shaped conductor connection section provided on the inserting side of the core, and the conductor connection sections of the plurality of hairpin-type conductor at overlapping positions are provided in a sequential lamination from the inside to the outside.

6. The electric motor according to claim 5, wherein pin ends of the hairpin-type conductor are configured such that pin ends of the electrode wiring of each phase of the winding structure are located on the inserting side of the core, and other pin ends extend out from the welding side of the core for providing electric connection.

7. The electric motor according to claim 6, wherein the pin ends of the winding structure of each phase protruding from the welding side of the core are configured such that the pin ends are bent with a distance of the same number of slots from the conductor body to a middle position of the corresponding slot along the circumference to be welded to form the connection.

8. The electric motor according to claim 7, wherein pin ends for welding connection are lined up in sequence and in the same direction as the depth of the slots.

9. The electric motor according to claim 5, further comprising:
a busbar provided on the inserting side of the iron core;
wherein the hairpin-type conductors for serial connection have no conductor connection sections, and conductor sections in slots of each hairpin-type conductor for serial connection and electrode wiring conductors are configured such that pin ends protruding from the inserting side are electrically connected by the busbar.

10. The electric motor according to claim 9, wherein the pin ends of the winding structure of each phase protruding from the welding side of the core are configured such that the pin ends are bent with a distance of the same number of slots from the conductor body to a middle position of the corresponding slot along the circumference to be welded to form the connection.

11. The electric motor according to claim 10, wherein pin ends for welding connection are lined up in sequence and in the same direction as the depth of the slots.

12. A winding structure arranged on an iron core of a stator, the iron core having a plurality of slots arranged along a circumferential direction, one side of the iron core being an inserting side, and the opposite side being a welding side, wherein the winding structure comprises a plurality of hairpin-type conductor of different shapes located in the slots, N parallel-wound sub-windings formed by the plurality of hairpin-type conductor and electrode wiring conductors, where N is a positive even number;
wherein the conductors of each one of the N-parallel wound sub-windings of the winding structure of each phase are located in non-adjacent layers of the slot, each sub-winding including:
a first standard hairpin-type conductor having an in-slot section of a $j^{th}$ layer in one slot and an in-slot section of a $j-1^{th}$ layer of another slot spaced apart from the one slot by y slots in a first circumferential direction;
a second standard hairpin-type conductor having an in-slot section of the $j^{th}$ layer in one slot and an in-slot section of a j+1$^{th}$ layer of another slot spaced apart from the one slot by y slots in the first circumferential direction;

a hairpin-type conductor for serial connection having an in-slot section of a L$^{th}$ layer in one slot and an in-slot section of a first layer in another slot spaced apart from the one slot by y+1 slots in the first circumferential direction;

wherein a plurality of first standard hairpin-type conductor in a same winding cycle, which corresponds to a circumvolution in the first circumferential direction, are configured such that: the in-slot sections in each slot are all in the same layer; the second standard hairpin-type conductor connects two first standard hairpin-type conductors of two neighboring winding cycles in the first circumferential direction to form a secondary sub-winding; and the hairpin-type conductor for serial connection connects the first standard hairpin-type conductors of two neighboring secondary sub-windings in the first circumferential direction to form a sub-winding;

where y denotes winding pitch; L is the total number of the layers in a slot; j denotes a natural number meeting the condition 1≤j≤L; and the first circumferential direction is a clockwise direction or a counterclockwise direction.

13. The winding structure according to claim 12, wherein the conductors for phase out of each sub-winding of the winding structure of each phase are configured in the first layer or the L$^{th}$ layer of the respective slots, and are configured to: for half sub-windings, the conductors for phase out are located in the first layer of an i$^{th}$ slot, and the conductors forming a neutral line are located in the L$^{th}$ layer of a slot spaced apart from the i$^{th}$ slot by y−1 slots in a second circumferential direction; and for the other half sub-windings, the conductor for phase out are located in the L$^{th}$ layer of an i−1$^{th}$ slots, and the conductor forming the neutral line are located in the first layer of slots spaced apart from the i−1$^{th}$ slots by y−1 slots in the first circumferential direction; where i denotes an integer meeting the condition 1≤ I≤ Q, and Q denotes the total number of the slots; the first layer denotes the outermost layer, and the L$^{th}$ layer denotes the innermost layer; and the second circumferential direction is opposite to the first circumferential direction.

14. An electric motor comprising:

the winding structure according to claim 12; and the iron core of the stator, the winding structure being arranged in the plurality of slots of the iron core.

* * * * *